3,271,342
COMPOSITION COMPRISING A SALT OF A STYRENE-MALEIC ACID COPOLYMER AND A POLYURETHANE
Hans H. Kuhn, Edgar Dare Bolinger, and Emile E. Habib, Spartanburg, S.C., assignors to Deering Milliken Research Corporation, Spartanburg, S.C., a corporation of Delaware
No Drawing. Filed Feb. 4, 1963, Ser. No. 256,153
7 Claims. (Cl. 260—29.6)

This invention relates to novel polymer compositions, more particularly to compositions comprising a mixture of a water-soluble partial metal salt of a styrene-maleic acid copolymer and a water-soluble polyurethane.

Styrene-maleic acid copolymers are a well-known and widely used class of compounds. Their partial sodium salts have been widely used as sizing materials for cellulose acetate warps. They are much less useful as sizes for warps formed of other materials, e.g., Dacron polyester or nylon multifilament yarns, because of their poor performance with other fibers, probably due primarily to their low adhesion values to these other fibers. Attempts to improve the adhesion by incorporating other polymers in the sizing bath have been frustrated for the most part because of polymer incompatibility, which produces weak, milky and brittle or rubbery, substantially useless films.

The film-forming water-soluble polyurethanes have excellent adhesion to substantially all textile fibers and thus are useful sizing materials. See U.S. Pat. 3,061,470. However, their hygroscopicity makes them unsuitable for such use at relative humidities above about 50–60%. Modifications directed to reducing the moisture sensitivity have been partially successful. See U.S. Pat. 3,044,898, and the application of Bolinger S.N. 24,885, filed April 27, 1960 and of Bolinger et al. S.N. 43,297, filed July 18, 1960. However, even with these modifications, the water-soluble polyurethanes have limited applicability as sizes in mills which are not air conditioned. Attempts to further reduce their moisture sensitivity by reaction with polymers containing acid groups which can form oxonium salts with the polyether groups of the polyurethanes have been unsuccessful because even when water-insolubility is reached, the polymer continues to absorb water, swell and become weak and/or rubbery. See Smith et al., Ind. and Eng. Chem. 51, 1361 (1959).

It was therefore surprising to discover that the water-soluble partial metal salts of styrene-maleic acid copolymers, which are incompatible with most other polymers, form useful mixtures with water-soluble polyurethanes, which are ordinarily incompatible with acid group bearing polymers, and that these mixtures form tough, orientable, heat-sealable, water-soluble films relatively insensitive to atmospheric moisture.

The novel compositions of this invention comprise a film-forming water-soluble partial metal salt of a styrene-maleic acid copolymer, i.e., the polymer contains sufficient acid groups to have a pH below about 9, and a film-forming water-soluble polyurethane in a weight proportion of the former to the latter of from about 9:1 to 1:9, preferably about 4:1 to 3:2.

It is an object of this invention to provide novel mixtures of water-soluble partial metal salts of styrene-maleic acid copolymers and of water-soluble polyurethanes, solutions and films thereof and a method for their use as sizing materials. Other objects will be apparent to those skilled in the art to which this invention pertains.

The film-forming water-soluble partial metal salts of styrene-maleic acid copolymers are prepared by alkaline hydrolysis of the corresponding styrene-maleic anhydride copolymer with a metal base or by neutralization to the proper extent of the corresponding styrene-maleic acid copolymer with a metal base. These partial salts are well known in the art. See, e.g., U.S. Pat. 2,490,489. One commercially available form is Stymer S (Monsanto Chemical Co.). To possess the desired film-forming properties, those partial metal salt polymers preferably should have a molecular weight of at least about 2,000, preferably at least about 5,000, e.g., between 5,000 and 10,000. As with most such polymers, the molar ratio of styrene to maleic anhydride moieties in the polymer is about 1:1, e.g., from about 0.8:1 to 1.2 to 1. Only the partial metal salts are employed in the compositions of this invention, i.e., those polymers containing free carboxylic acid groups, preferably about the mono metal salt. These will have a pH between about 4 and 9, preferably about 6.5 to 8.5 as a 5% aqueous solution. Although any metal salt polymer which is water-soluble can be used, the alkali-metal salts are preferred, especially the mono sodium salt.

The film-forming water-soluble polyurethanes used in the compositions of this invention are also known in the art. See U.S. Pats. 2,948,691; 3,044,898; and 3,061,470. They are prepared by the reaction of a water-soluble polyalkylene ether glycol with about 1 to 1.5 molar equivalents of a diisocyanate with a glycol having sufficient solubilizing groups so that water-solubility is retained in the resulting polyurethane. Diisocyanates which can be used to prepare the polyurethane include 2,4-tolylene diisocyanate, 2,6-tolylene diisocyanate, m-phenylene diisocyanate, 2,2'-dinitrodiphenylene-4,4'-diisocyanate, cyclohexyphenyl - 4,4' - diisocyanate, hexamethylene diisocyanate, diphenylene-4,4'-diisocyanate, diphenylmethane-4,4'-diisocyanate, di-paraxylylmethane-4,4'-diisocyanate, naphthalene-1,4-diisocyanate and the corresponding 1,5 and 2,7 isomers thereof, fluorene-2,7-diisocyanate, chlorophenylene-2,4-diisocyanate and dicyclohexylmethane-4,4'-diisocyanate. The aryl diisocyanates are preferred. The glycols most frequently used are the water-soluble polyalkylene ether glycols, i.e., the water-soluble polyether glycols which are derived from alkylene oxides or glycols, e.g., those represented by the formula $HO(C_nH_{2n}O)_mH$, in which $n$ is an integer from 2 to 8 and $m$ is an integer from about 15 to about 450. Not all the alkylene radicals present need be the same as polyether glycols containing a mixture of alkylene radicals can be used. The molecular weights of the polyalkylene ether glycols used to produce the polyurethanes preferably are from about 2,000 to 20,000, more desirably from about 4,000 to 10,000, e.g., 5,500 to 7,000. The term "polyalkylene ether glycol" includes copolymers of polyethylene ether glycol with polypropylene, polytrimethylene, polytetramethylene, and polybutylene ether glycols. The preferred glycols are polyethylene ether glycols.

The usual polyurethane catalysts can be employed, e.g., bases or organometallic salts, preferably cobalt naphthenate. Materials which promote cross-linking, e.g., polyhydroxy compounds or excessive amounts of water, should be avoided during the reaction to prevent water insolubilization, although small amounts of water appear to facilitate the initiation of the reaction. A reaction temperature between about 70° to 95° C. is preferred. A molar proportion of diisocyanate to glycol of about 1.2:1 usually gives the best results. A reaction time which produces a polymer having a viscosity of between 100,000 and 1,000,000 cps. as a 50% solution in toluene at about 80° C. gives good results. These polymers will provide 25% aqueous solutions having a viscosity of about 6,000 cps. at 25° C. or higher. These polyurethanes can be further modified by incorporating a lower-alkylene oxide in the terminal portion of the reaction and/or by subsequently reacting the polyurethane, usually in aqueous solution, with an aldehyde, preferably formaldehyde, employing amounts dependent upon the pH of the reaction mixture. With the latter reaction, water-insolubility can readily be reached on the acid side, even when employing relatively small molar amounts of the aldehyde. Therefore a pH above about 7 is usually employed. For details of each of these reactions, see U.S. 3,044,898.

The compositions of this invention comprise 9:1 to 1:9 by weight mixtures of the water-soluble metal partial salts of styrene-maleic acid copolymers and water-soluble polyurethanes as defined herein, respectively, preferably 4:1 to 3:2 by weight mixtures, as dry mixtures, aqueous or organic solutions or as films. The films can be prepared in the conventional manner, e.g., by extrusion or casting from a solution. When cast from aqueous solution, the films preferably should be dried at elevated temperatures, e.g., 50–100° C. These films are useful as packaging films. In such use, the film and its contents can be dissolved in water, e.g., for detergents and dry bleaches now packaged in polyvinyl alcohol films. The novel compositions can also be used as warp sizing materials, as mentioned above, in the same manner as the water-soluble polyurethanes, having the advantage of reduced tackiness while retaining good film strength at high relative humidities.

The following examples are illustrative of the compositions of this invention, but are not to be construed as limiting. All proportions and amounts are by weight, unless otherwise indicated.

*Example I*

Prepare a 25% solution of a water-soluble polyurethane which is the propylene oxide modified reaction product of a polyethylene ether glycol having an average molecular weight of about 6,000 and 2,4-tolylene diisocyanate and which has a viscosity, as a 25% aqueous solution of at least 6,000 cps. at room temperature. (For details of preparation, see the first paragraph of Preparation I of U.S. Patent No. 3,044,898.) Also prepare a 25% aqueous solution of the mono sodium salt of a styrene-maleic acid copolymer having a molecular weight between about 5,000 and 10,000 (Monsanto Stymer S).

Prepare 9:1, 4:1, 3:1, 7:3, 15:7, 3:2, 1:1, 2:3, 7:15, 3:7, 1:3, 1:4 and 1:9 by weight mixtures of the styrene-maleic acid sodium salt copolymer and the polyurethane.

Dilute the mixtures to between about 12% and 15% solids with alcohol (Synasol) or with water. Cast films about 0.001 to 0.003 inch thick. Following a modified ASTM Method D 903–49 "ASTM Stds. on Adhesives," December 1957, pp. 66–69, cut portions of the dried films into 1″ x 6″ strips. Place the strips between 1″ x 9″ strips of the fabric selected for the adhesion test and heat the laminate in a metal mold at 75–80° C. for one hour, cool to room temperature and measure peeling adhesion on an Instron tensile testing machine. All of the compositions will show satisfactory adhesion to rayon, superior in all instances to the Stymer S alone. Satisfactory to excellent adhesion to Dacron polyester is obtained with the 4:1 to 1:9 compositions, thus establishing their utility as sizing materials. The 4:1 to 3:2 compositions are preferred at high relative humidities.

All of the films are heat-sealable and water-soluble. The 9:1, 4:1 and 3:1 compositions are relatively insensitive to atmospheric moisture at 65%–85% relative humidities. All of the films have good strength and flexibility, indicating excellent compatibility of the Stymer S and the polyurethane polymers. Using a filament rayon taffeta as test fabric (Test Fabrics, Inc.), the films give average adhesion values of between about 3 and 4 lbs. With filament dacron and acetate taffetas average adhesion values from 0.7 lbs. (9:1 mixture) to about 6.5 lbs. (1:9 mixture) ase obtained for the dacron and from about 2 to 5 lbs. for the acetate. Spun Dacron fabric gives adhesion values from about 3 (9:1 mixture) to about 15 (1:9 mixture) lbs.

*Example II*

Follow the procedure of Example I to produce the styrene-maleic acid and polyurethane mixtures recited therein. Spray dry or freeze dry each of them. Dry powders of the mixtures are obtained which can be used to produce heat-sealable, water-soluble films. Alternatively, the solid mono sodium salt of the styrene-maleic acid polymer can be mixed with the aqueous solution of the polyurethane to reduce the amount of moisture that must be removed. Also, the dry polyurethane, prepared by precipitating it at below room temperatures from the toluene in which it is prepared, can be mixed with the dry styrene-maleic acid copolymer.

Each, some, or all of the following variations in the film-forming compositions described in Example I can be made:

(a) The degree of neutralization of the styrene-maleic acid copolymer can be such that the pH of the 25% aqueous solution is 4.5 to 9.0 or any value in between.

(b) The potassium or any other water-soluble metal salt can be used in place of the sodium salt.

(c) The ratio of styrene to maleic acid moieties in the copolymer can be varied anywhere from 0.8:1 to 1.2:1.

(d) The polyurethane can be the reaction product of m-phenylene diisocyanate, methylene-bis-(4-phenyl isocyanate), hexamethylene diisocyanate or other arylene, alkylene, aralkylene or alkarylene diisocyanate instead of tolylene-2,4-diisocyanate.

(e) The polyurethane can be the reaction product of polyethylene ether glycol of a molecular weight of 4,000, 5,000, 10,000, 20,000, 100,000 or higher.

(f) The polyurethane used can be prepared by omitting the propylene oxide.

(g) The polyurethane used can be further modified before use by reaction with formaldehyde or other aldehyde (in the manner described in the second paragraph of Preparation I of U.S. Pat. 3,044,898).

(h) The solutions can be varied from about 2% to 50% polymer solids.

What is claimed is:

1. A flexible, film-forming, water-soluble composition comprising a mixture of
    (a) a film-forming water-soluble partial metal salt of a styrene-maleic acid copolymer, having a pH between about 4 and 9, and
    (b) a film-forming water-soluble polyurethane which is the reaction product of a diisocyanate and a polyalkylene ether glycol,
in a proportion of (a) to (b) of from about 9:1 to 1:9.

2. A composition according to claim 1 wherein the proportion of (a) to (b) is from about 4:1 to 3:2.

3. A composition according to claim 1 wherein the styrene-maleic acid copolymer is the mono sodium salt of styrene-maleic acid copolymer having a molecular weight of between about 5,000 and 10,000.

4. A composition according to claim 1 wherein the polyurethane is the reaction product of an aryl diisocyanate and a polyethylene ether glycol and has a viscosity, as a 25% aqueous solution at about 25° C. of at least 6,000 cps.

5. A water solution of a composition according to claim 1.

6. A flexible, heat-sealable, film-forming, water-soluble composition comprising a mixture of
    (a) a film-forming, water-soluble mono sodium salt of a styrene-maleic acid copolymer having a molecular weight between about 5,000 and 10,000, and
    (b) a film-forming water-soluble polyurethane, which is the reaction product of an aryl diisocyanate and a polyethylene ether glycol of a molecular weight before polymerization of at least 6,000, and which has a viscosity as a 25% aqueous solution at about 25° C. of at least 6,000 cps.
in a proportion of (a) to (b) of from about 4:1 to 3:2.

7. A water solution of a composition according to claim 6.

References Cited by the Examiner
UNITED STATES PATENTS

| | | | |
|---|---|---|---|
| 2,490,489 | 12/1949 | Tauch | 260—886 |
| 3,044,898 | 7/1962 | Habib | 260—18 |
| 3,061,470 | 10/1962 | Kuemmerer | 260—75 |

FOREIGN PATENTS 744,027  6/1956  Great Britain.

MURRAY TILLMAN, *Primary Examiner.*

N. F. OBLON, *Assistant Examiner.*